(12) United States Patent
Sun et al.

(10) Patent No.: US 7,661,658 B2
(45) Date of Patent: Feb. 16, 2010

(54) SUBMERSIBLE HOLLOW SHAFT MOTOR AND SUBMERSIBLE FLOATING AERATOR COMPRISING THE SAME

(76) Inventors: Shulin Sun, No. 139 Hongfa Road, Zoucheng Economic Development, Zoucheng (CN) 273500; Jian Sun, No. 139 Hongfa Road, Zoucheng Economic Development, Zoucheng (CN) 273500

( * ) Notice: Subject to any disclaimer, the term of this patent is extended or adjusted under 35 U.S.C. 154(b) by 273 days.

(21) Appl. No.: 11/953,093

(22) Filed: Dec. 10, 2007

(65) Prior Publication Data

US 2008/0143000 A1    Jun. 19, 2008

(30) Foreign Application Priority Data

Dec. 15, 2006   (CN) ......................... 2006 1 0168196

(51) Int. Cl.
*B01F 3/04* (2006.01)
(52) U.S. Cl. .................... 261/87; 210/242.2; 261/93; 261/120; 261/DIG. 47; 415/7; 415/115; 416/85
(58) Field of Classification Search ............... 261/87, 261/91, 93, 120, DIG. 47; 210/242.1, 242.2; 310/89; 415/7, 115, 170.1, 230; 416/85
See application file for complete search history.

(56) References Cited

U.S. PATENT DOCUMENTS

| | | | | | |
|---|---|---|---|---|---|
| 2,801,083 | A | * | 7/1957 | Balassa | 366/76.1 |
| 3,796,417 | A | * | 3/1974 | Kaelin | 261/93 |
| 3,823,923 | A | * | 7/1974 | Chapsal | 261/93 |
| 4,139,579 | A | * | 2/1979 | Blum | 261/29 |
| 4,242,289 | A | * | 12/1980 | Blum | 261/93 |
| 4,308,221 | A | * | 12/1981 | Durda | 261/87 |
| 4,618,426 | A | * | 10/1986 | Mandt | 210/620 |
| 4,732,682 | A | * | 3/1988 | Rymal | 210/620 |
| 4,774,031 | A | * | 9/1988 | Schurz | 261/87 |
| 4,954,295 | A | * | 9/1990 | Durda | 261/16 |
| 5,183,596 | A | * | 2/1993 | Rajendren et al. | 261/93 |

(Continued)

FOREIGN PATENT DOCUMENTS

JP        4-78492   A   *   3/1992

*Primary Examiner*—Richard L Chiesa
(74) *Attorney, Agent, or Firm*—Matthias Scholl P.C.; Matthias Scholl

(57) ABSTRACT

Provided is a submersible floating aerator, including a submersible hollow shaft motor (1) including a hollow shaft (2), a bottom shaft extension (4), a first motor flange (15), a second motor flange (16), a first flange (24) and a second flange (25), a gas-ring compressor (17), a base (21) having a gas inlet hole (22), a gas inlet tube (23), a dome (26), a propeller assembly (60) and an air outlet opening (18); wherein the base (21) is fixed on the top of the gas inlet tube (23), the gas-ring compressor (17) is fixed on the base (21) via a bracket (19); the air outlet opening (18) is connected to the gas-inlet hole (22) via a pipe (20); the gas inlet tube (23) is fixed to the first motor flange (15) via a first flange (24); the second motor flange (16) is fixed to the dome (26) via the second flange (25); the bottom shaft extension (4) is coaxially connected to the propeller assembly (60); and the hollow shaft (2) rotates along with the propeller assembly (60). The submersible floating aerator features large aeration depth, high utilization of oxygen, and uniform gas distribution.

17 Claims, 11 Drawing Sheets

U.S. PATENT DOCUMENTS

| | | | | |
|---|---|---|---|---|
| 5,744,072 | A * | 4/1998 | Karliner | 261/87 |
| 5,762,833 | A * | 6/1998 | Gross et al. | 261/93 |
| 5,851,443 | A * | 12/1998 | Rajendren | 261/87 |
| 6,126,150 | A * | 10/2000 | Van Dyk | 261/87 |
| 6,860,474 | B2 * | 3/2005 | Blakley et al. | 261/87 |
| 7,172,177 | B2 * | 2/2007 | Durda | 261/28 |
| 2004/0130042 | A1 * | 7/2004 | Blakley et al. | 261/87 |
| 2005/0263913 | A1 * | 12/2005 | Rajendren | 261/93 |
| 2006/0087047 | A1 * | 4/2006 | Mathur et al. | 261/93 |
| 2007/0035045 | A1 * | 2/2007 | Henley | 261/87 |

* cited by examiner

SUBMERSIBLE HOLLOW SHAFT MOTOR AND SUBMERSIBLE FLOATING AERATOR COMPRISING THE SAME

CROSS-REFERENCE TO RELATED APPLICATIONS

This application claims priority to Chinese Patent Application No. 200610168196.0 filed on Dec. 15, 2006, the contents of which are incorporated herein by reference.

BACKGROUND OF THE INVENTION

1. Field of the Invention

The invention relates to a submersible hollow shaft motor and to a submersible floating aerator comprising a submersible hollow shaft motor.

2. Description of the Related Art

Liquid aeration is used in the treatment of liquids for the purpose of mixing in air and increasing the dissolved oxygen (DO) content of the liquids. When liquid aeration is used as part of a wastewater treatment, bacteria and other microorganisms are usually added to the liquid as well to breakdown organic matter within the wastewater. In other applications, aeration processes are used in the treatment of water to meet the dissolved oxygen requirements for supporting fish and other aquatic organisms, for example, in aquaculture.

Conventionally, apparatuses used for liquid aeration include surface aerators, diffuser/blowers, and rotor aerators. Surface aerators pump water upward and throw it into the air. They require high horsepower and consume high amounts of energy to pump liquids against the force of gravity. In blower/diffuser systems, compressed air is introduced through diffusers at the bottom of a basin. Relatively high power is required to pressurize atmospheric air to overcome the liquid head resistance. Oxygen rises vertically and escapes quickly before effectively dispersing into the liquid. Rotor aerators consist of rotating aerators positioned at the surface of the liquid receiving treatment. Rotor systems have been known to be expensive to maintain and are high in energy consumption. They throw liquid into the air, creating aerosol that releases malodors. Rotor systems are often used in oxidation ditch applications.

The problems with conventional aerators include limited depth of aeration, low utilization of oxygen, and non-uniform gas distribution. Moreover, the motors of conventional aerators are located above the liquid level, and are prone to failure due to high operating temperatures.

SUMMARY OF THE INVENTION

In view of the above-described problems, it is one objective of the invention to provide a submersible hollow shaft motor that overcomes the failure problem caused by high operating temperature. Another objective of the invention is to provide a submersible floating aerator that features large aeration depth, high utilization of oxygen, and uniform gas distribution.

To achieve the above objectives, in accordance with one embodiment of the invention, provided is a submersible hollow shaft motor, comprising a hollow shaft (2), a top oil chamber (5), a middle oil chamber (11), a bottom oil chamber (9), a top shaft extension (3), and a bottom shaft extension (4).

In certain classes of this embodiment, a sand-throwing ring (6) is disposed between the top shaft extension (3) and the top oil chamber (5).

In certain classes of this embodiment, a keyway (7) is disposed at one end of the bottom shaft extension (4).

In certain classes of this embodiment, a pair of mechanical seals (10) is disposed in the top oil chamber (5) and the bottom oil chamber (9).

In certain classes of this embodiment, a stator (12) and a rotor (13) are disposed in the middle oil chamber (11).

In certain classes of this embodiment, a cable (14) is connected to the middle oil chamber (11).

In certain classes of this embodiment, the cable (14) passes through the top oil chamber (5) and the mechanical seal (10).

In accordance with another embodiment of the invention, provided is a submersible floating aerator, comprising a submersible hollow shaft motor (1) comprising a hollow shaft (2), a bottom shaft extension (4), a first motor flange (15), a second motor flange (16), a first flange (24) and a second flange (25), a gas-ring compressor (17), a base (21) having a gas inlet hole (22), a gas inlet tube (23), a dome (26), a propeller assembly (60), and an air outlet opening (18).

In certain classes of this embodiment, the base (21) is fixed on the top of the gas inlet tube (23).

In certain classes of this embodiment, the gas-ring compressor (17) is fixed on the base (21) via a bracket (19).

In certain classes of this embodiment, the air outlet opening (18) is connected to the gas-inlet hole (22) via a pipe (20).

In certain classes of this embodiment, the gas inlet tube (23) is fixed to the first motor flange (15) via a first flange (24).

In certain classes of this embodiment, the second motor flange (16) is fixed to the dome (26) via the second flange (25).

In certain classes of this embodiment, the bottom shaft extension (4) is coaxially connected to the propeller assembly (60).

In certain classes of this embodiment, the hollow shaft (2) rotates along with the propeller assembly (60).

In certain classes of this embodiment, the gas inlet tube (23) is replaced by an L-shaped gas inlet tube (30).

In certain classes of this embodiment, one end of the L-shaped gas inlet tube (30) is fixed to the bottom of the base (21), and another end the L-shaped gas inlet tube (30) is fixed to the first motor flange (15) via the first flange (24).

In certain classes of this embodiment, the base (21) is disposed on a pair of first bridge supports (49) and a second bridge support (54) perpendicular thereto.

In certain classes of this embodiment, the submersible hollow shaft motor (1) further comprises a bottom oil chamber (9).

In certain classes of this embodiment, one end of a support pole (50) is connected to the bottom oil chamber (9), and the other end thereof is connected to the base (21).

In certain classes of this embodiment, the support pole (50) is parallel to an upper part of the L-shaped gas inlet tube (30).

In certain classes of this embodiment, one end of a fixed pole (51) is fixed to the bottom oil chamber (9), and the other end thereof is fixed to an iron pipe (52).

In certain classes of this embodiment, the iron pipe (52) is parallel to the first bridge support (49).

In certain classes of this embodiment, the propeller assembly (60) comprises a propeller (27), a jet mixer (28) and a bubble-dialing fin (29).

In certain classes of this embodiment, the propeller (27) comprises a hub (31) and three blades (32).

In certain classes of this embodiment, the jet mixer (28) comprises a nozzle (36), one or more puff ports (38), two or more water inlets (34), a suction pipe (33), a supporting plate (37), a mixing diffuser (35) and a diffusion port (39).

In certain classes of this embodiment, a pair of floating balls (40) is uniformly disposed at the bottom of the base (21).

In certain classes of this embodiment, at least two mooring eyes (44) are uniformly disposed on the base (21).

In certain classes of this embodiment, a rope (45) is connected between the mooring eye (44) and a water pool (46).

DETAILED DESCRIPTION OF THE INVENTION

Figure 1:
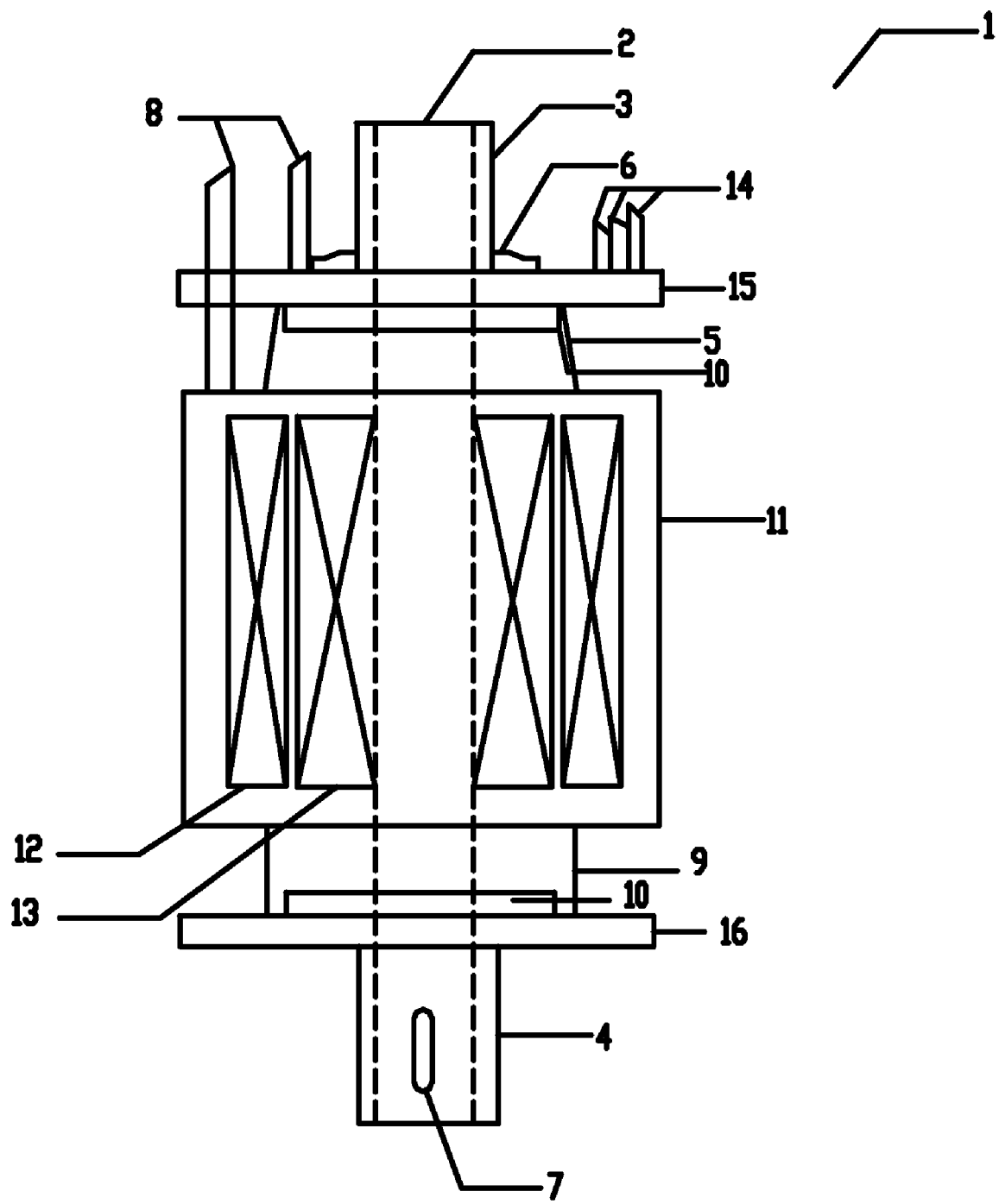
FIG. 1 is a schematic diagram of a submersible hollow shaft motor according to one embodiment of the invention.

As shown in FIG. 1, a submersible hollow shaft motor comprises a hollow shaft 2, a top oil chamber 5, a middle oil chamber 11, a bottom oil chamber 9, a top shaft extension 3, and a bottom shaft extension 4. A sand-throwing ring 6 is disposed between the top shaft extension 3 and the top oil chamber 5. A keyway 7 is disposed at one end of the bottom shaft extension 4. A pair of mechanical seals 10 is disposed, one in the top oil chamber 5 and one in the bottom oil chamber 9. A stator 12 and a rotor 13 are disposed in the middle oil chamber 11. A cable 14 is connected to the middle oil chamber 11, and passes through the top oil chamber 5 and the mechanical seal 10. The top oil chamber 5, the middle oil chamber 11 and the bottom oil chamber 9 are connected to the air above water via a pipe 8.

Figure 2:
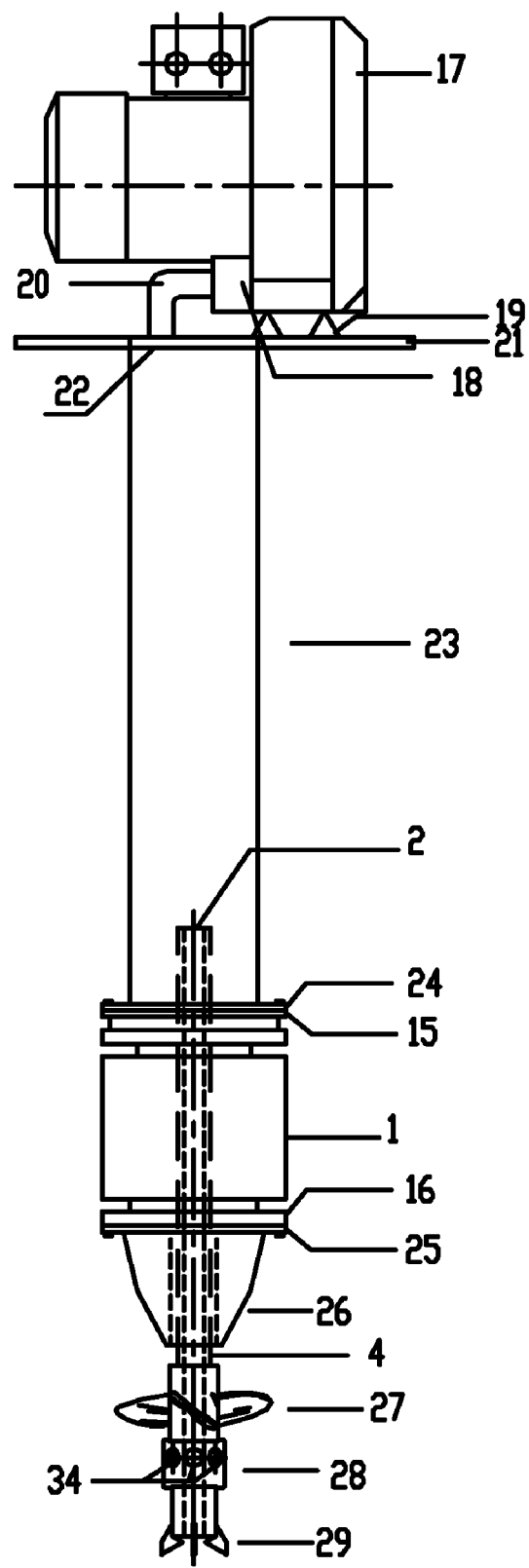
FIG. 2 illustrates a submersible floating aerator having a vertical-placed submersible hollow shaft motor according to one embodiment of the invention.
Figure 4:
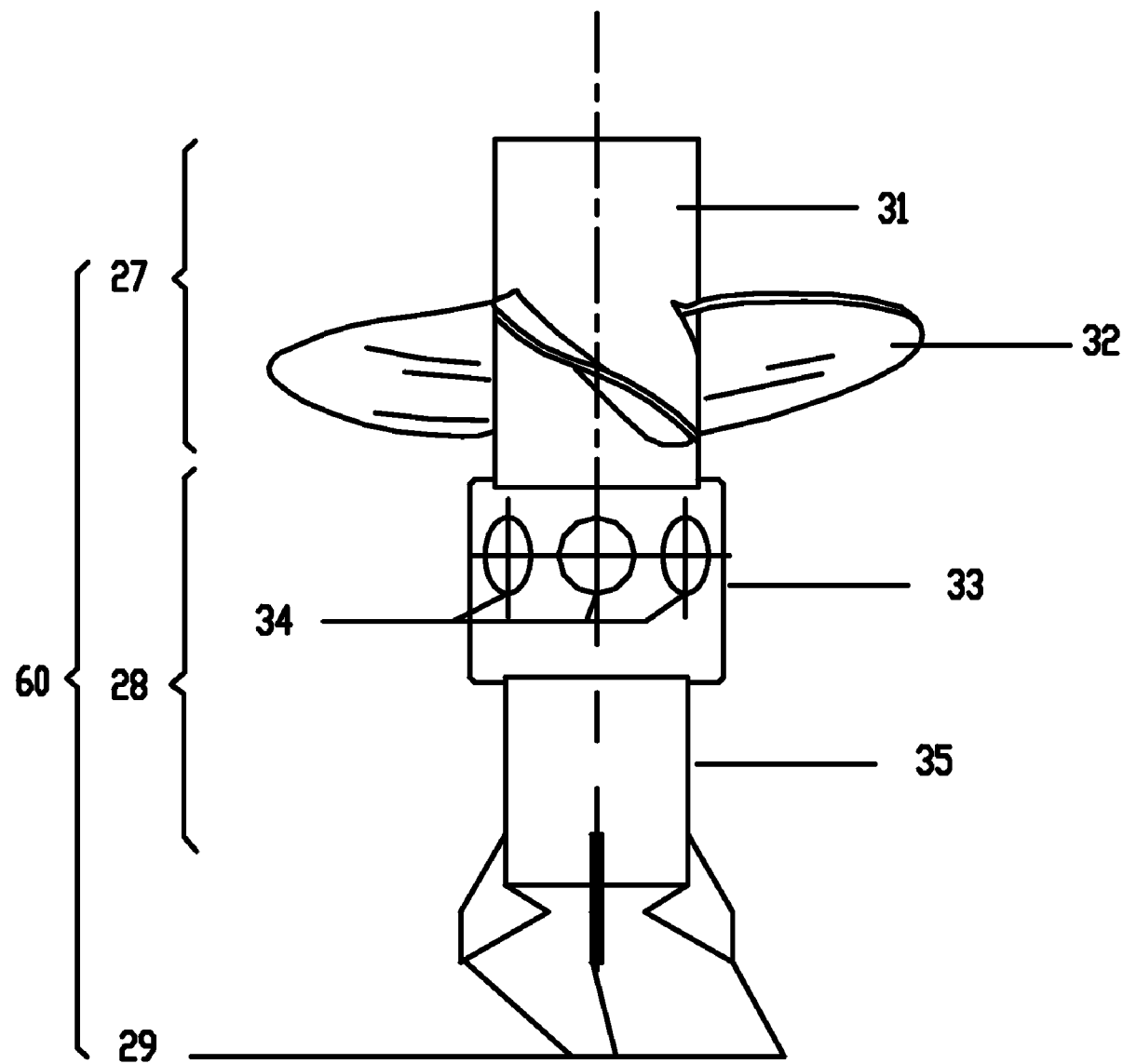
FIG. 4 illustrates a propeller assembly according to one embodiment of the invention.

As shown in FIGS. 2 and 4, a submersible floating aerator comprises a submersible hollow shaft motor 1, a second flange 25, a gas-ring compressor 17, a base 21, a gas inlet tube 23, a dome 26, a propeller assembly 60, and an air outlet opening 18. The submersible hollow shaft motor 1 is the same as that shown in FIG. 1. The base 21 is disposed at the top of the gas inlet tube 23, and comprises a gas-inlet hole 22. The gas-ring compressor 17 is fixed on the base 21 via bracket 19. The air outlet opening 18 is connected to the gas-inlet hole 22 via pipe 20. The gas inlet tube 23 is fixed to the first motor flange 15 via a first flange 24. The second motor flange 16 is fixed to the dome 26 via the second flange 25.

As shown in FIG. 4, the propeller assembly 60 comprises a propeller 27, a jet mixer 28 and a bubble-dialing fin 29. The propeller 27 comprises a hub 31 and three blades 32.

Referring again to FIG. 1, the bottom shaft extension 4 is coaxially connected to the propeller assembly 60 via the keyway 7. The hollow shaft 2 rotates along with the propeller assembly 60.

The submersible floating aerator operates as follows: the gas-ring compressor 17 compresses air above the water level, and outputs the compressed air at high pressure via the air outlet opening 18. The compressed air flows into the gas inlet tube 23 via the pipe 20 and the gas-inlet hole 22. The air passes through the hollow shaft 2 of the motor 1 and then enters the jet mixer 28. The compressed air is then mixed in the jet mixer 28 with water entering from the water inlet 34 to form air-water mixture. After the air-water mixture is aerated by the bubble-dialing fin 29 and atomized into fine bubbles, fog-shaped water mist carrying the fine bubbles is ejected from the end of the jet mixer 28. With stirring and push-flow by the propeller 27, the fine bubbles disperse to a deeper and wider region, and thus deep-water aeration is realized.

Figure 3:
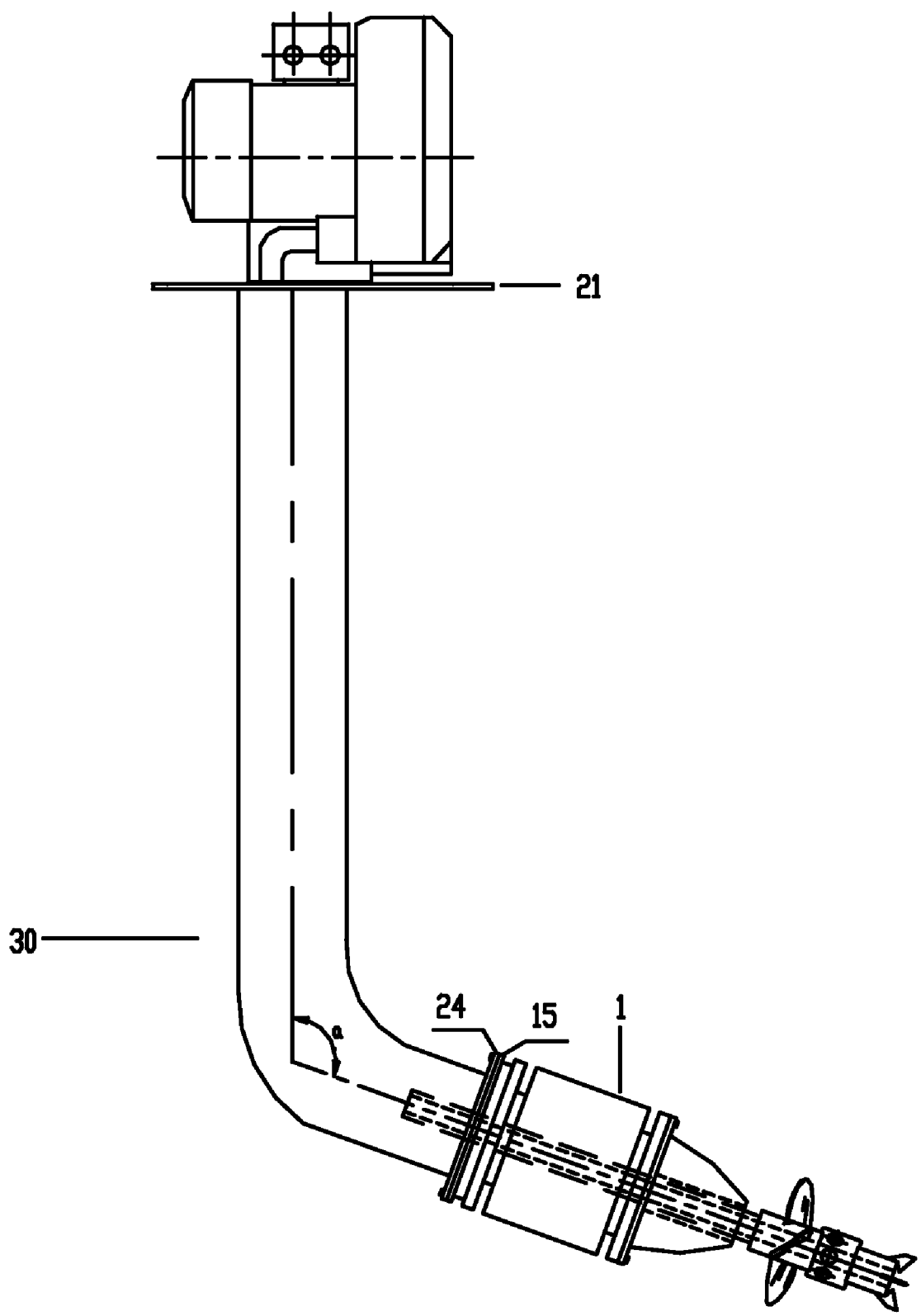
FIG. 3 illustrates a submersible floating aerator having a non-vertical (L-shaped) submersible hollow shaft motor according to one embodiment of the invention.

As shown in FIG. 3, the straight-design gas inlet tube 23 is replaced by an L-shaped gas inlet tube 30. One end of the L-shaped gas inlet tube 30 is connected to the base 21, and the other end thereof is fixed to the first motor flange 15 via the first flange 24. An angle α of the L-shaped gas inlet tube 30 is between 90° and 180°. Other components of the aerator are the same as those shown in FIG. 2.

An aerator employing the L-shaped gas inlet tube 30 is capable of agitating activated sludge at the bottom of an oxidation ditch and keep it suspended, so as to enable sufficient contact between microorganisms within the sludge and air entering water, to effectively eliminate organic compounds in wastewater, and to increase flow velocity and treatment efficiency of wastewater in the oxidation ditch. Therefore, it is especially applicable for aeration, stirring, mixing and flow-pushing during an oxidation ditch process of wastewater treatment.

As shown in FIG. 4, two or more water inlets 34 are disposed in the vicinity of the suction pipe 33 at the top of the jet mixer 28. A mixing diffuser 35 is connected to the bottom of the suction pipe 33, and two or more bubble-dialing fins 29 are disposed at the bottom end of the mixing diffuser 35.

Figure 5:
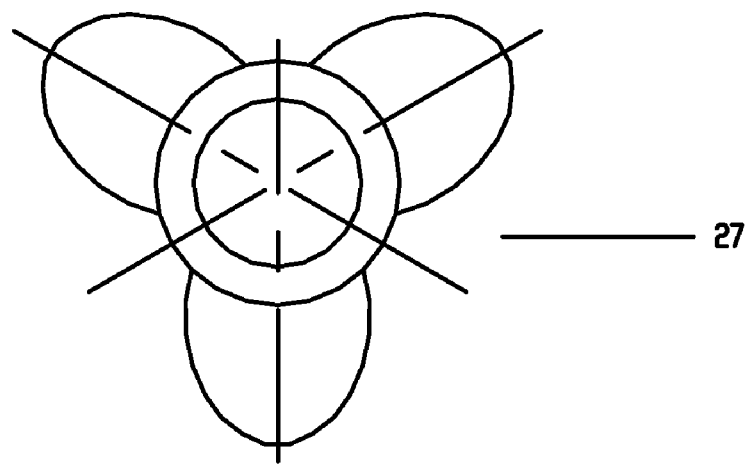
FIG. 5 illustrates a top view and a cross-sectional view of a propeller assembly according to one embodiment of the invention.
Figure 5:
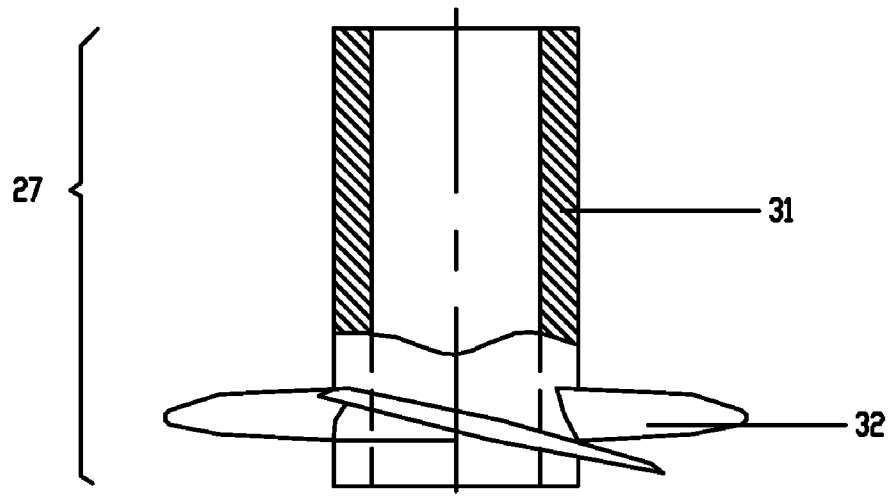
Figure 5:
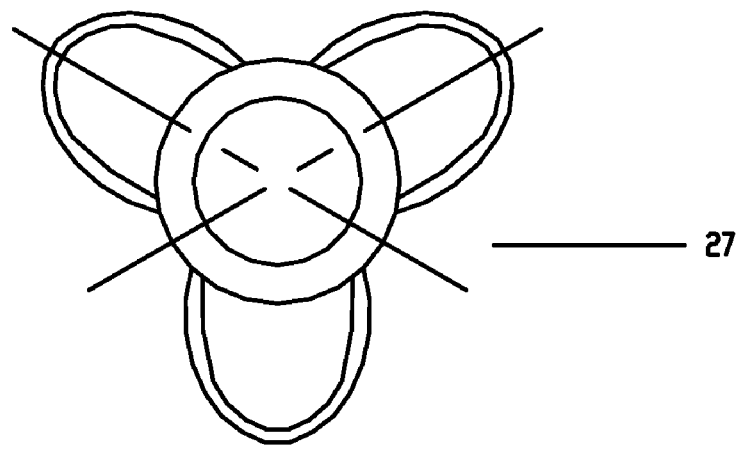

As shown in FIG. 5, the propeller 27 comprises a hub 31 and three blades 32.

Figure 6:
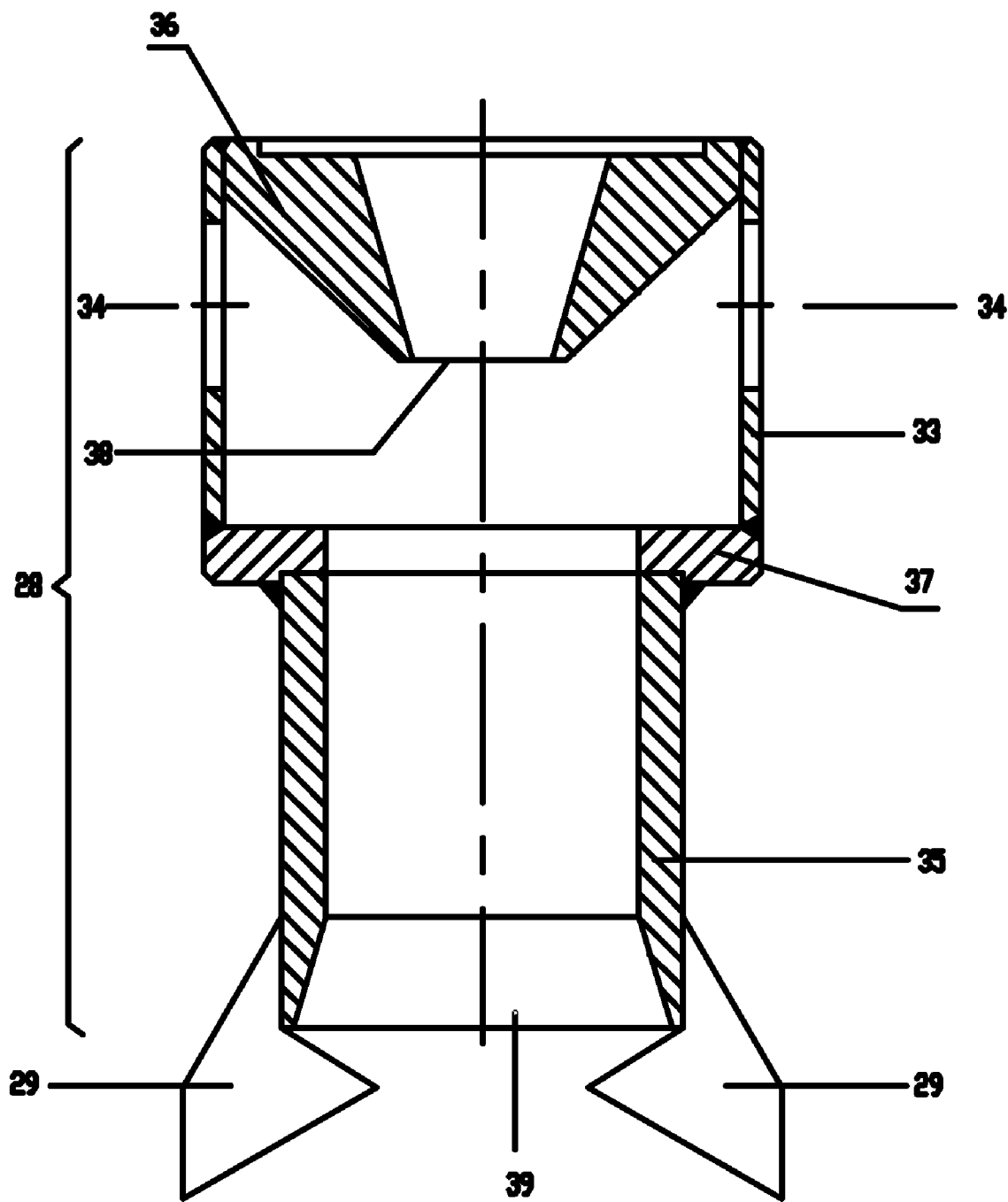
FIG. 6 is a cross-sectional view of a jet mixer and a bubble-dialing fin according to one embodiment of the invention.

As shown in FIG. 6, the jet mixer 28 comprises a nozzle 36, one or more puff ports 38, two or more water inlets 34, a suction pipe 33, a supporting plate 37, a mixed diffuser 35, and a diffusion port 39. Two or more bubble-dialing fins 29 are disposed at one end of the mixed diffuser 35. The nozzle 36 has the shape of a funnel, and is located at the top of the inner part of the suction pipe 33. The puff ports 38 are disposed at the bottom of the nozzle 36. The water inlets 34 are disposed on the suction pipe 33 in the vicinity of the nozzle 36. The suction pipe 33 is connected to the mixing diffuser 35 via the supporting plate 37. The diffusion port 39 is inverted funnel shaped, and is disposed at the bottom of the mixed diffuser 35. The bubble-dialing fins 29 are disposed at the end of the mixed diffuser 35 in the vicinity of the diffusion port 39.

The jet mixer 28 and the bubble-dialing fin 29 operate as follows: compressed air entering the suction pipe 33 is mixed with water flowing into the suction pipe 33 via the water inlet 34 forming an air-water mixture. After the air-water mixture is aerated by the bubble-dialing fin 29 and atomized into fine bubbles, a fog-shaped water mist column carrying the micro bubbles is ejected from the diffusion port 39, and the fine bubbles spread to a deeper and wider region. Meanwhile, the diffusion port 39 releases and diffuses the air-water mixture.

Figure 7:
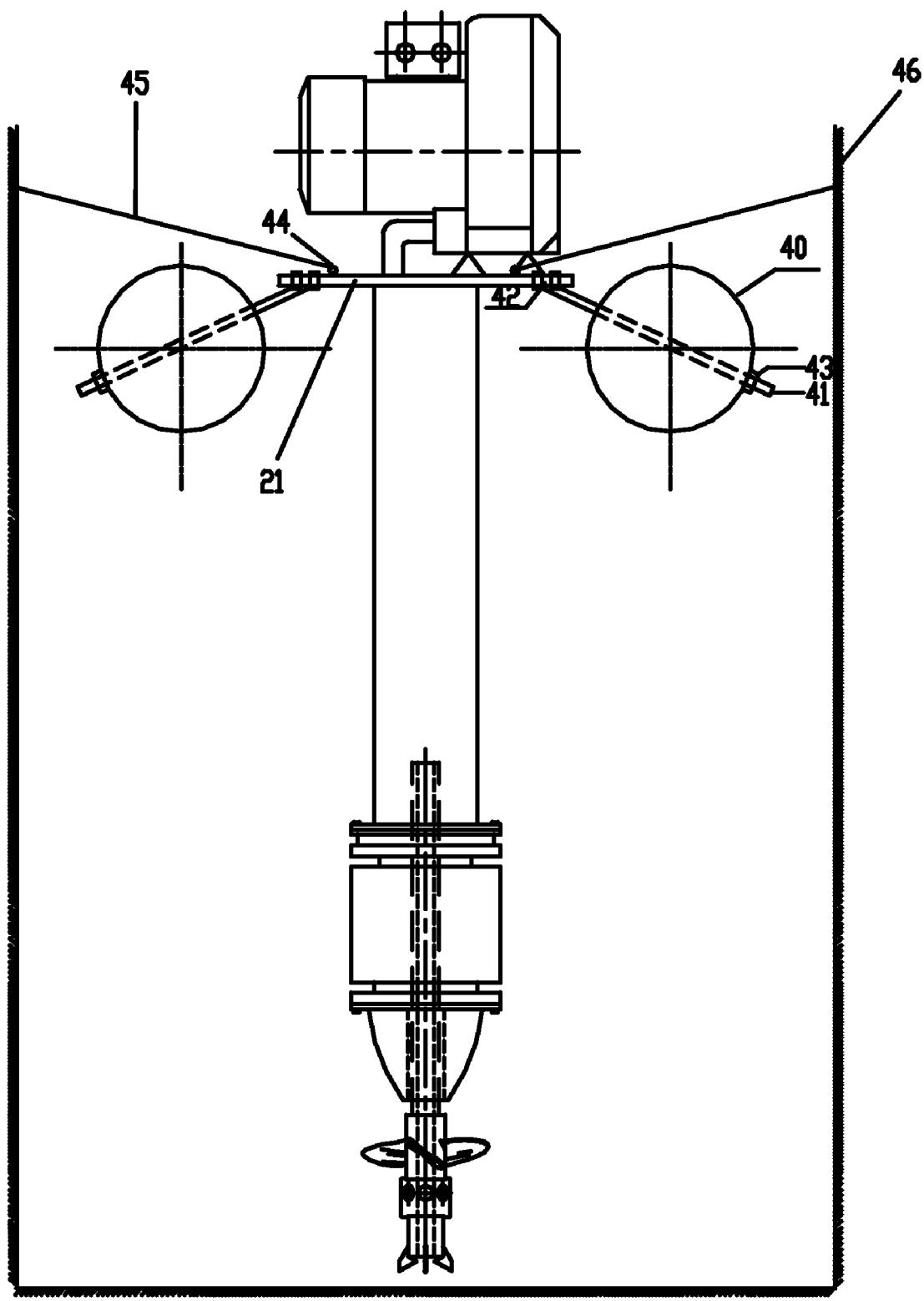
FIG. 7 is a side view of a submersible floating aerator installed via floating balls according to one embodiment of the invention.

As shown in FIG. 7, the aerator is installed in a water pool via a floating ball and a rope. At least two floating balls 40 of the same size are uniformly disposed in the vicinity of the base 21. A support pipe 41 passes through the center of the floating ball 40, one end of the support pipe 41 is fixed to an edge of the base 21 via a screw 42, and the other end thereof is fixed to a surface of the floating ball 40 via another screw 43. At least two mooring eyes 44 are uniformly disposed on the base 21, and a rope 45 is connected between the mooring eye 44 and a water pool 46.

Figure 8:
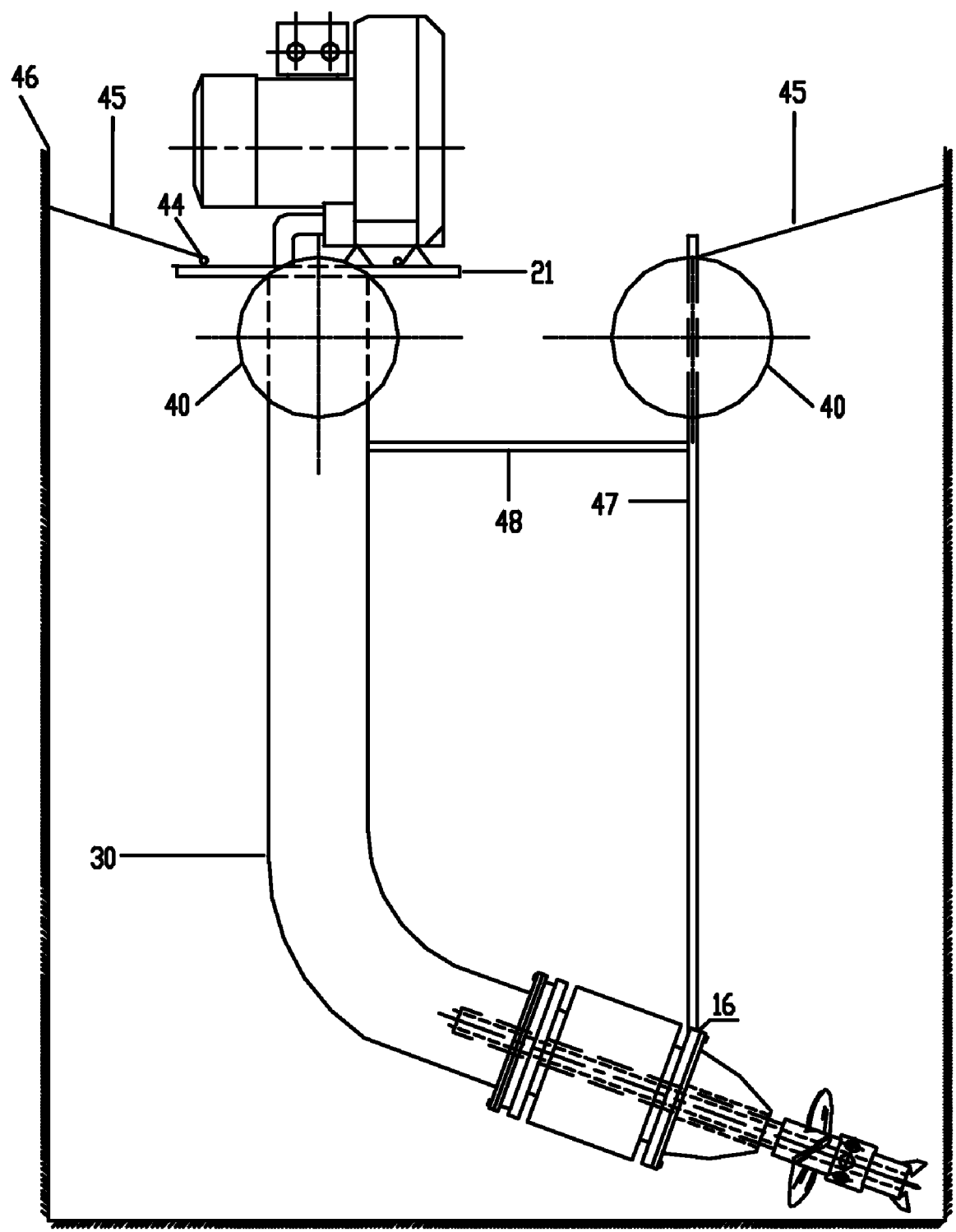
FIG. 8 is a side view of a submersible floating aerator installed via floating balls according to another embodiment of the invention.

As shown in FIG. 8, the L-shaped aerator is installed in a water pool via a floating ball, a support pipe, and a rope. One end of a support pipe 47 disposed non-parallel to the hollow shaft 2 and parallel to an upper part of the L-shaped gas inlet tube 30 is fixed on the second motor flange 16, and the other end thereof passes through the center of the floating ball 40. One end of the support pipe 48 perpendicular to an upper part of the L-shaped gas inlet tube 30 and non-parallel to the hollow shaft 2 is fixed on the L-shaped gas inlet tube 30, and the other end thereof is perpendicularly fixed on the support pipe 47. At least two floating same-size balls 40 of the same size are uniformly disposed in the vicinity of an edge of the base 21. A support pipe (not numbered) passes through the center of the floating ball 40, one end of the support pipe is fixed to an edge of the base 21, and the other end thereof is fixed to a surface of the floating ball 40. At least two mooring eyes 44 are uniformly disposed on the base 21, and a rope 45 is connected between the mooring eye 44 and a water pool 46.

Figure 9:
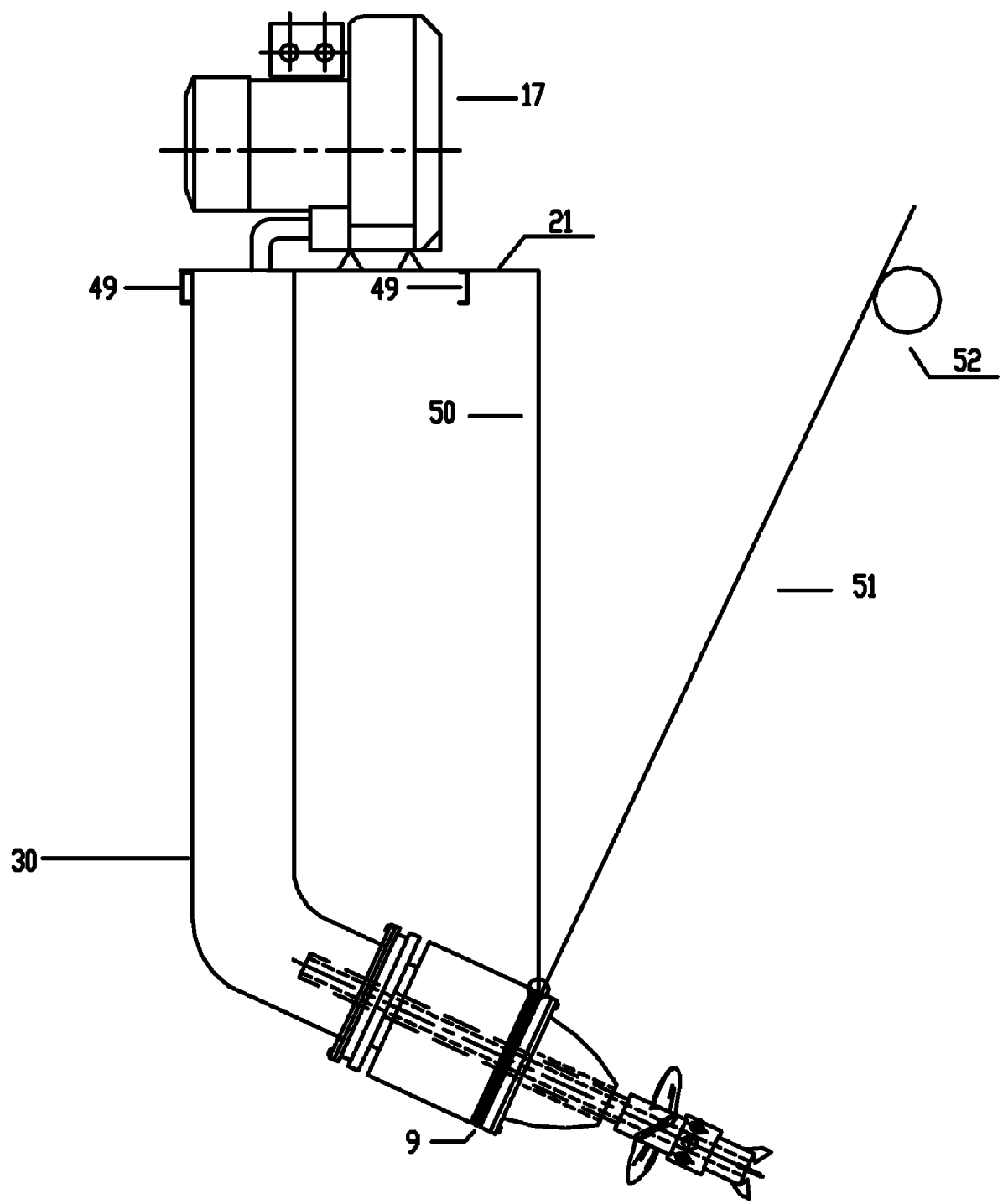
FIG. 9 is a side view of a submersible floating aerator installed via a bridge support according to one embodiment of the invention.
Figure 10:
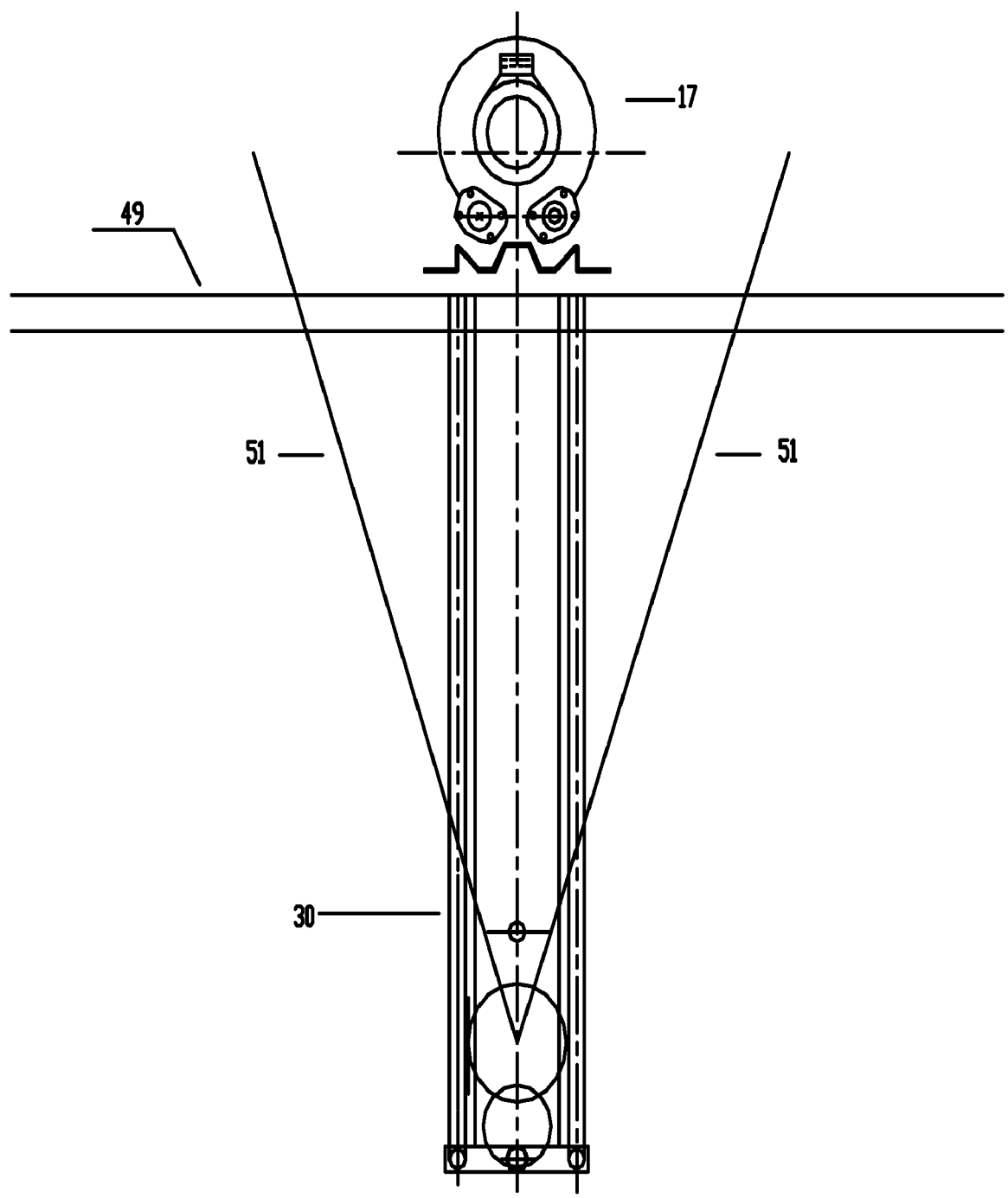
FIG. 10 is a back view of a submersible floating aerator installed via a bridge support according to one embodiment of the invention.
Figure 11:
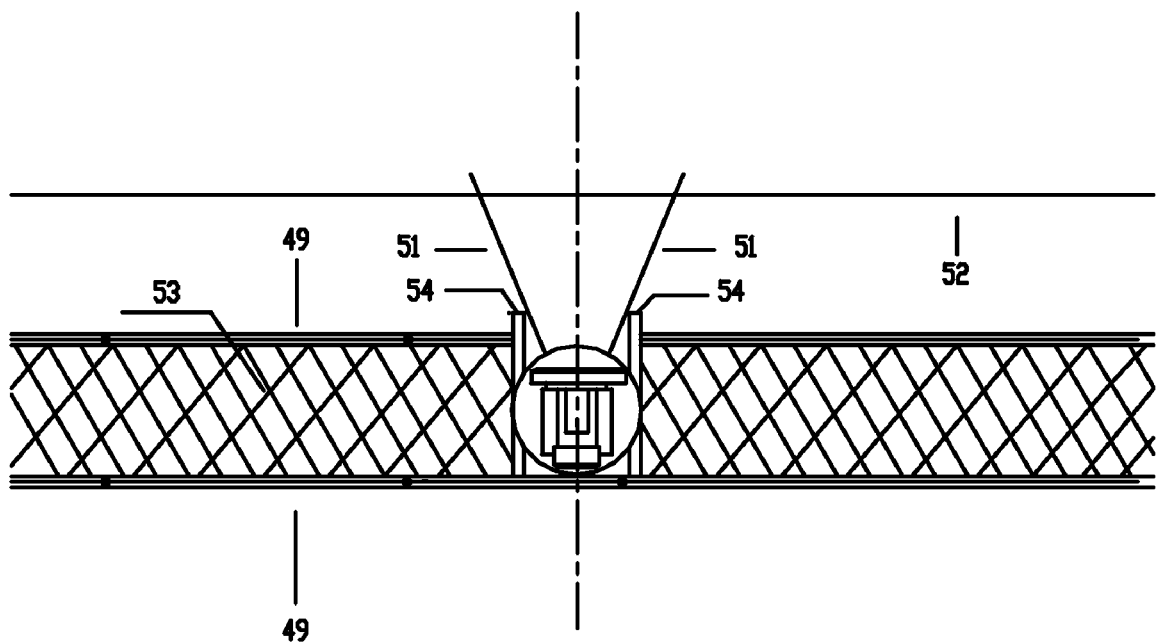
FIG. 11 is a top view of a submersible floating aerator installed via a bridge support according to one embodiment of the invention.

As shown in FIGS. 9, 10 and 11, the aerator is installed in a water pool via a bridge support. The base 21 is disposed on a pair of first bridge supports 49 and a second bridge support 54 perpendicular thereto. An iron plate 53 is disposed between the first bridge supports 49. One end of a support pole 50 is connected to the bottom oil chamber 9, the other end thereof is connected to the base 21, and the support pole 50 is parallel to an upper part of the L-shaped gas inlet tube 30. One end of a fixed pole 51 is fixed to the bottom oil chamber 9, and the other end thereof is fixed to an iron pipe 52. The pipe 52 is parallel to the first bridge supports 49.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

What is claimed is:

1. A submersible hollow shaft motor (1), comprising:
   a hollow shaft (2);
   a top oil chamber (5);
   a sand-throwing ring (6);
   a middle oil chamber (11);
   a bottom oil chamber (9);
   a top shaft extension (3); and
   a bottom shaft extension (4);
   wherein
      said sand-throwing ring (6) is disposed between said top shaft extension (3) and said top oil chamber (5);
      a keyway (7) is disposed at one end of said bottom shaft extension (4);
      a pair of mechanical seals (10) is disposed one in said top oil chamber (5) and one in said bottom oil chamber (9);
      a stator (12) and a rotor (13) are disposed in said middle oil chamber (11); and
      a cable (14) is connected to said middle oil chamber (11).

2. The submersible hollow shaft motor of claim 1, wherein said cable (14) passes through said top oil chamber (5) and said mechanical seal (10).

3. A submersible floating aerator, comprising:
   a submersible hollow shaft motor (1) comprising a hollow shaft (2), a bottom shaft extension (4), a first motor flange (15), a second motor flange (16), a first flange (24), and a second flange (25);
   a gas-ring compressor (17);
   a base (21) having a gas-inlet hole (22);
   a gas inlet tube (23);
   a dome (26);
   a propeller assembly (60); and
   an air outlet opening (18);
   wherein
      said base (21) is disposed at the top of said gas inlet tube (23);
      said gas-ring compressor (17) is fixed on said base (21) via a bracket (19);
      said air outlet opening (18) is connected to said gas-inlet hole (22) via a pipe (20);
      said gas inlet tube (23) is fixed to said first motor flange (15) via a first flange (24);
      said second motor flange (16) is fixed to said dome (26) via said second flange (25);
      said bottom shaft extension (4) is coaxially connected to said propeller assembly (60); and
      said hollow shaft (2) rotates along with said propeller assembly (60).

4. The submersible floating aerator of claim 3, wherein said gas inlet tube (23) is an L-shaped gas inlet tube (30).

5. The submersible floating aerator of claim 4, wherein one end of said L-shaped gas inlet tube (30) is fixed to the bottom of said base (21), and another end thereof is fixed to said first motor flange (15) via said first flange (24).

6. The submersible floating aerator of claim 5, wherein said base (21) is disposed on a pair of first bridge supports (49) and a second bridge support (54) perpendicular thereto.

7. The submersible floating aerator of claim 6, wherein said submersible hollow shaft motor (1) further comprises a bottom oil chamber (9).

8. The submersible floating aerator of claim 7, wherein one end of a support pole (50) is connected to said bottom oil chamber (9), and the other end thereof is connected to said base (21).

9. The submersible floating aerator of claim 8, wherein said support pole (50) is parallel to an upper part of said L-shaped gas inlet tube (30).

10. The submersible floating aerator of claim 9, wherein one end of a fixed pole (51) is fixed to said bottom oil chamber (9), and the other end thereof is fixed to an iron pipe (52).

11. The submersible floating aerator of claim 10, wherein said iron pipe (52) is parallel to said first bridge support (49).

12. The submersible floating aerator of claim 3, wherein said propeller assembly (60) comprises a propeller (27), a jet mixer (28) and a bubble-dialing fin (29).

13. The submersible floating aerator of claim 12, wherein said propeller (27) comprises a hub (31) and three blades (32).

14. The submersible floating aerator of claim 12, wherein said jet mixer (28) comprises a nozzle (36), one or more puff ports (38), two or more water inlets (34), a suction pipe (33), a supporting plate (37), a mixing diffuser (35) and a diffusion port (39).

15. The submersible floating aerator of claim 3, wherein a pair of floating balls (40) is uniformly disposed at the bottom of said base (21).

16. The submersible floating aerator of claim 15, wherein at least two mooring eyes (44) are uniformly disposed on said base (21).

17. The submersible floating aerator of claim 16, wherein a rope (45) is connected between said mooring eye (44) and a water pool (46).

* * * * *